United States Patent
Singleton, Jr.

(10) Patent No.: US 6,817,641 B1
(45) Date of Patent: Nov. 16, 2004

(54) ROBOTIC ARM AND HAND

(76) Inventor: Lawrence J. Singleton, Jr., 3010 Oak Pointe Dr., Lompoc, CA (US) 93436

(*) Notice: Subject to any disclaimer, the term of this patent is extended or adjusted under 35 U.S.C. 154(b) by 111 days.

(21) Appl. No.: 10/232,041

(22) Filed: Aug. 30, 2002

(51) Int. Cl.$^7$ ................................................ B25J 15/10
(52) U.S. Cl. ......................... 294/106; 294/111; 901/25; 901/29; 901/36
(58) Field of Search ................................. 294/106, 111; 901/25, 29, 38, 36; 414/4; 623/61–64

(56) References Cited

U.S. PATENT DOCUMENTS

| | | | |
|---|---|---|---|
| 1,225,415 A | | 5/1917 | Cronemiller |
| 1,301,575 A | | 4/1919 | Krawczynski |
| D185,571 S | | 6/1959 | Reed et al. |
| 3,866,966 A | * | 2/1975 | Skinner, II .................. 294/106 |
| 4,094,016 A | | 6/1978 | Eroyan |
| 4,246,661 A | * | 1/1981 | Pinson ......................... 623/25 |
| 4,351,553 A | * | 9/1982 | Rovetta et al. ............. 294/106 |
| 4,364,593 A | | 12/1982 | Maeda |
| 4,834,443 A | | 5/1989 | Crowder et al. |
| 4,986,723 A | * | 1/1991 | Maeda ........................ 414/729 |
| 5,080,682 A | * | 1/1992 | Schectman .................... 623/64 |
| 5,092,646 A | * | 3/1992 | Smallridge .................. 294/111 |
| 5,200,679 A | * | 4/1993 | Graham ................. 318/568.16 |
| 5,280,981 A | * | 1/1994 | Schulz ........................ 294/106 |
| 5,447,403 A | * | 9/1995 | Engler, Jr. ...................... 414/4 |
| 6,505,870 B1 | * | 1/2003 | Laliberte et al. ............ 294/106 |

* cited by examiner

*Primary Examiner*—Dean J. Kramer (57) ABSTRACT

A robotic arm and hand for imitating the human hand. The robotic arm and hand includes a motor member being coupled to a frame member. The motor member is designed for being operationally coupled to the control system and a power source whereby the control system is for controlling power from the power supply to the motor member. A drive assembly is operationally coupled to the motor member whereby the drive assembly is rotated by the motor member. A plurality of cable assemblies are coupled to the drive assembly whereby each of the cable assemblies is actuated by the drive assembly when the drive assembly is rotated by the motor member. A plurality of phalange assemblies are coupled to the cable assemblies. Each of the phalange assemblies is designed for being moved like the fingers of a human when the cable assemblies are actuated by the drive assembly.

14 Claims, 6 Drawing Sheets

ROBOTIC ARM AND HAND

BACKGROUND OF THE INVENTION

1. Field of the Invention

The present invention relates to object grasping systems and more particularly pertains to a new robotic arm and hand for imitating the human hand.

2. Description of the Prior Art

The use of object grasping systems is known in the prior art. U.S. Pat. No. 4,364,593 describes a system for approaching an object at an increased speed and grasping the object at a reduced speed. Another type of object grasping system is U.S. Pat. No. 1,225,415 having an artificial arm and hand for use as a prosthetic for a lost limb of a user. U.S. Pat. No. 4,834,443 has a robotic gripping device for simulating the action of human fingers gripping an object. U.S. Pat. No. 4,094,016 has an artificial hand and forearm to be used as prosthetic replacement of a lost limb of a user. U.S. Pat. No. 1,301,575 has a artificial for fitting onto a stub of the user as a prosthetic replacement for a user. U.S. Pat. No. Des. 185,571 shows a toy mechanical hand.

SUMMARY OF THE INVENTION

An object of the present invention is to provide a new robotic arm and hand that simulates the characteristics of the human hand for a robot.

Even still another object of the present invention is to provide a new robotic arm and hand that provides fine control for precise control of the fingers.

To this end, the present invention generally comprises a motor member being coupled to a frame member. The motor member is designed for being operationally coupled to the control system and a power source whereby the control system is for controlling power from the power supply to the motor member. A drive assembly is operationally coupled to the motor member whereby the drive assembly is rotated by the motor member. A plurality of cable assemblies are coupled to the drive assembly whereby each of the cable assemblies is actuated by the drive assembly when the drive assembly is rotated by the motor member. A plurality of phalange assemblies are coupled to the cable assemblies. Each of the phalange assemblies is designed for being moved like the fingers of a human when the cable assemblies are actuated by the drive assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
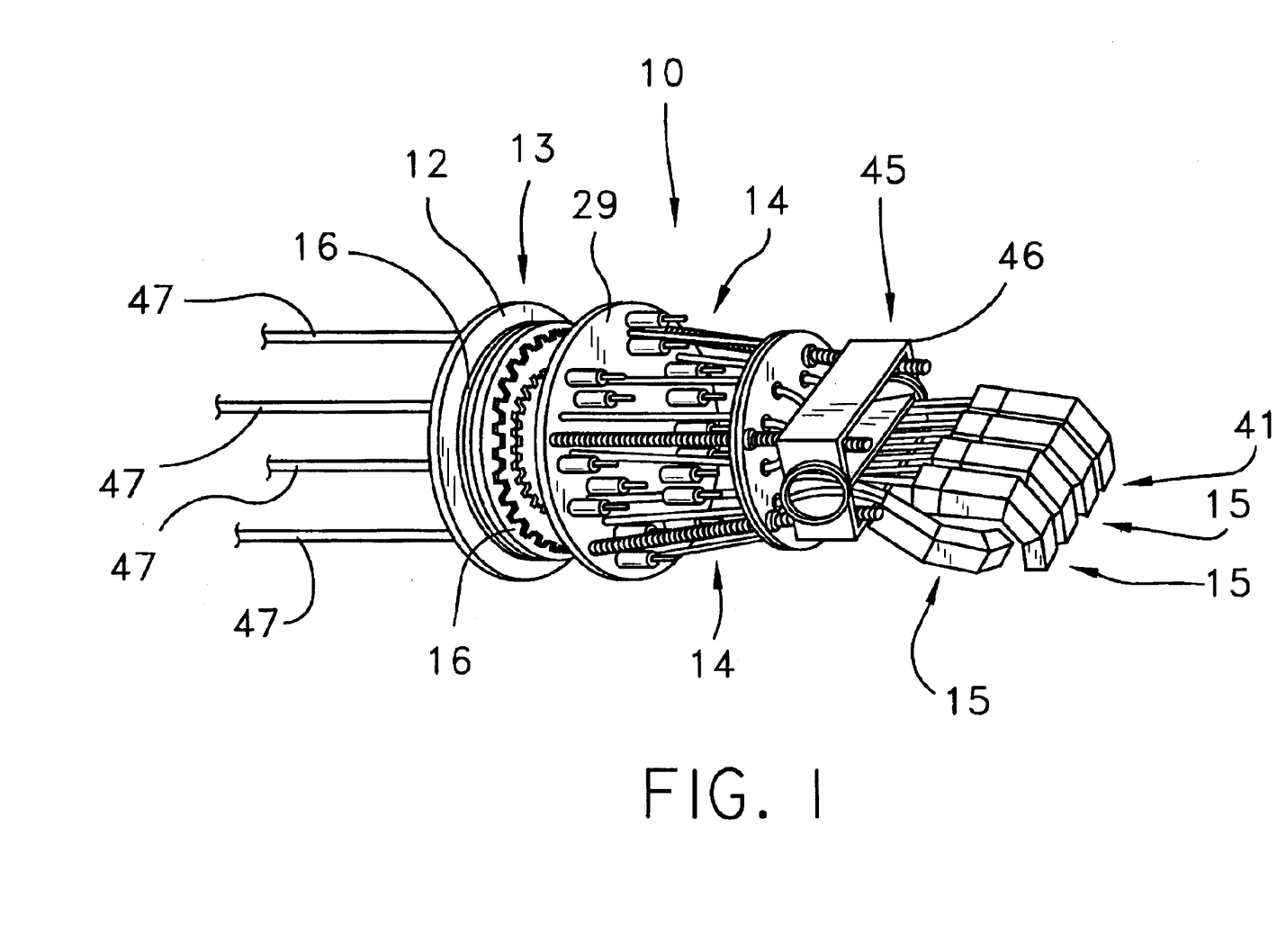
FIG. 1 is a perspective view of a new robotic arm and hand according to the present invention.
Figure 2:
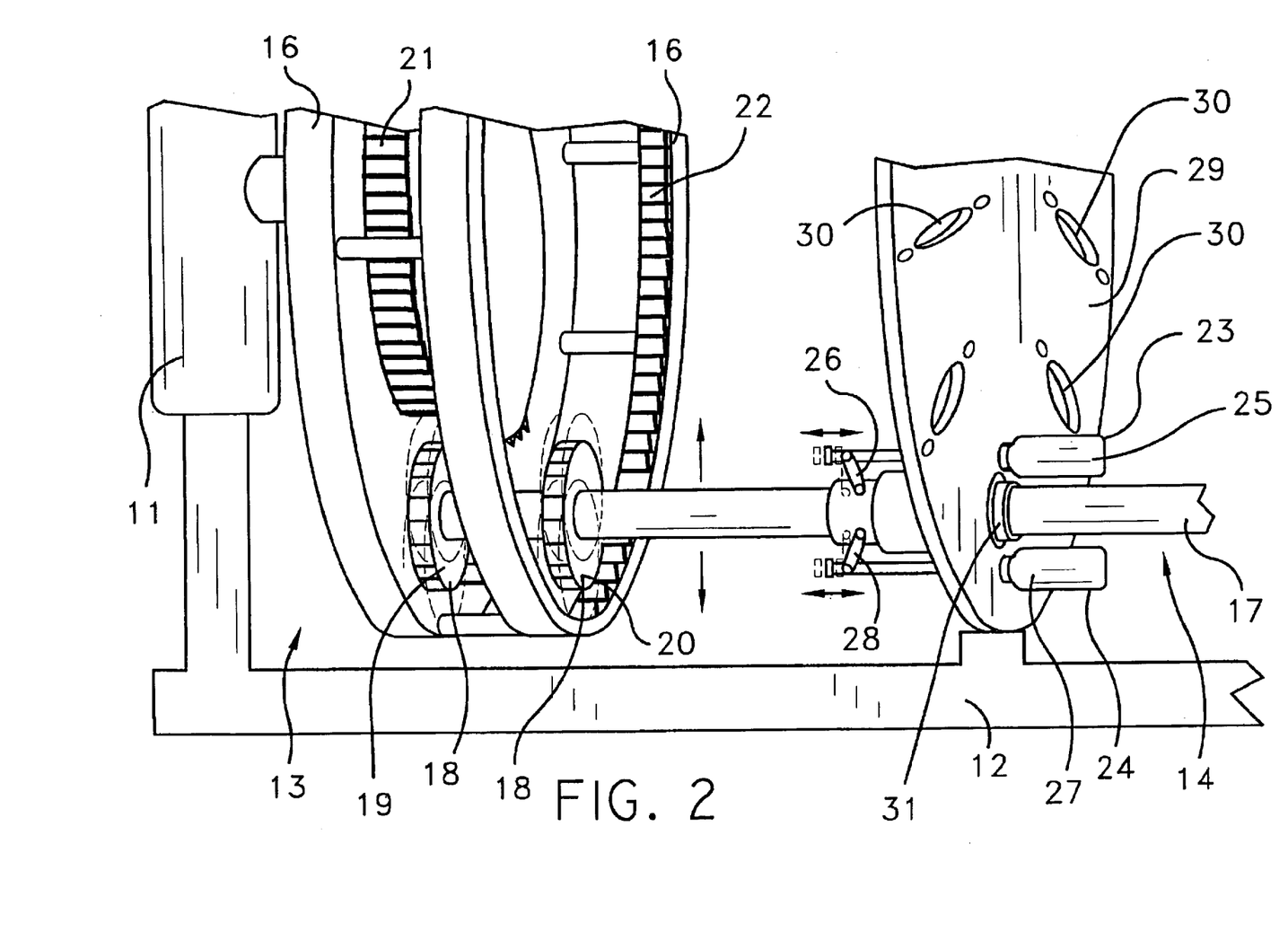
FIG. 2 is an enlarged perspective view of the present invention showing one of the cable assemblies and the drive assembly.
Figure 3:
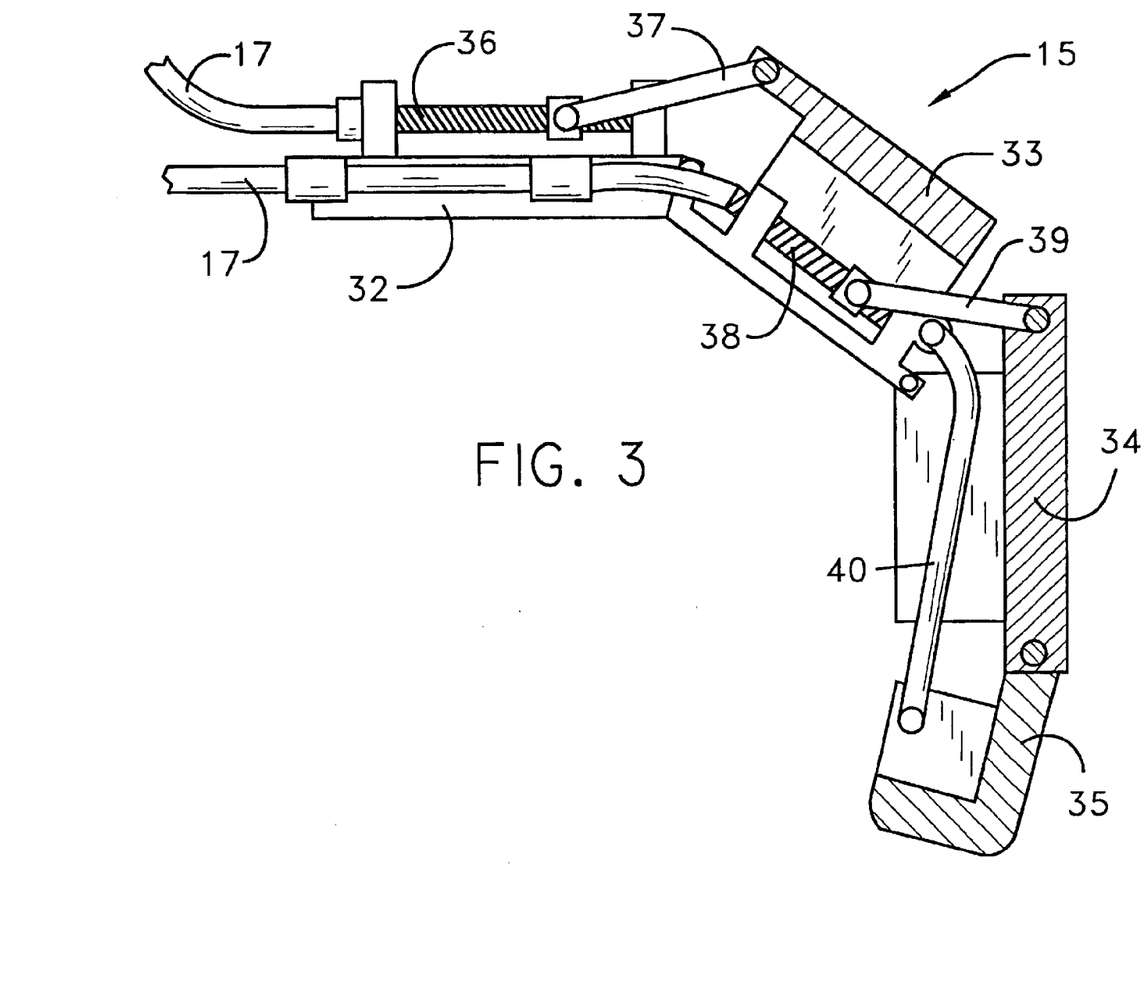
FIG. 3 is a cross-sectional view of one of phalange assemblies of the present invention.
Figure 4:
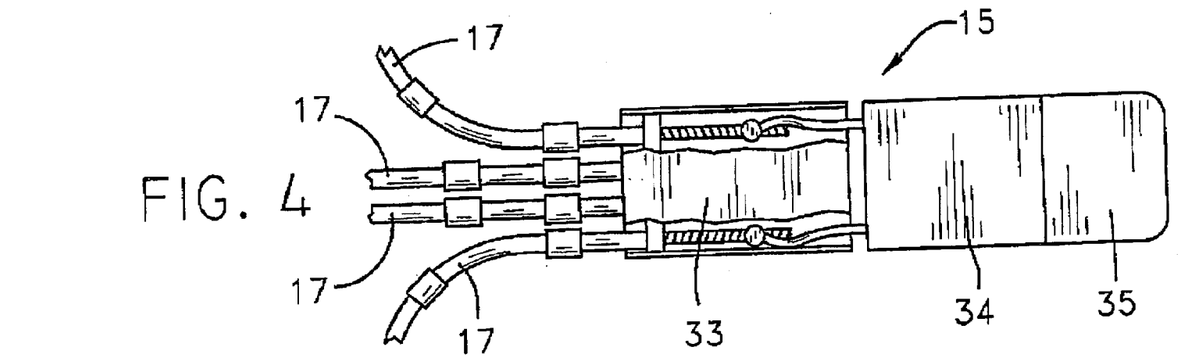
FIG. 4 is a partial cross-sectional view of one of the phalange assemblies of the present invention representing the thumb of the human hand.
Figure 5:
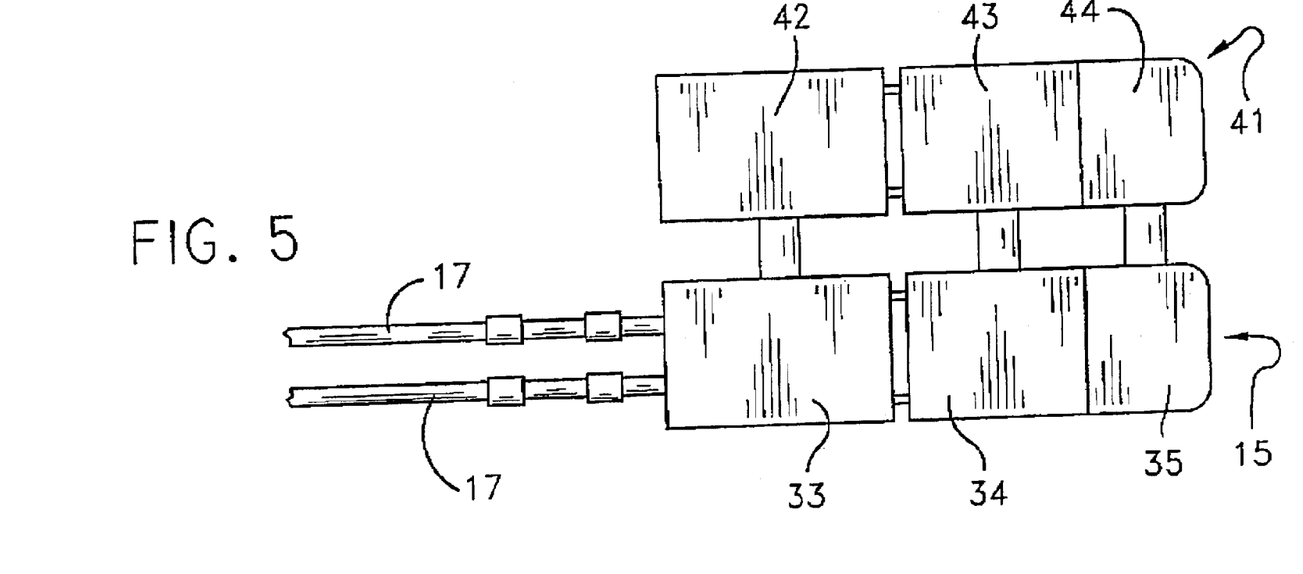
FIG. 5 is a top view of one of the phalange assemblies and the digit assembly the present invention.
Figure 6:
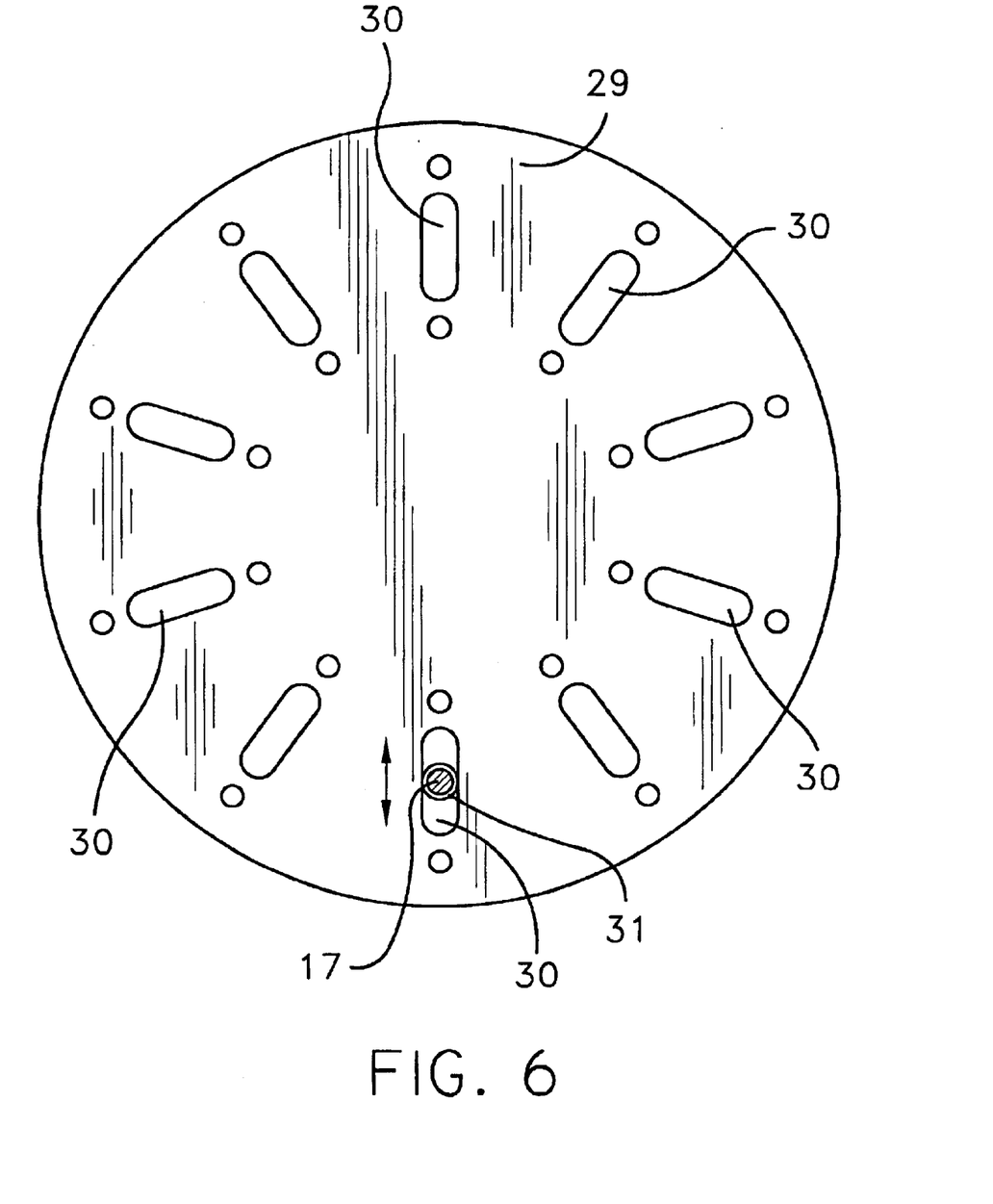
FIG. 6 is a front view of the alignment plate of the present invention.
Figure 7:
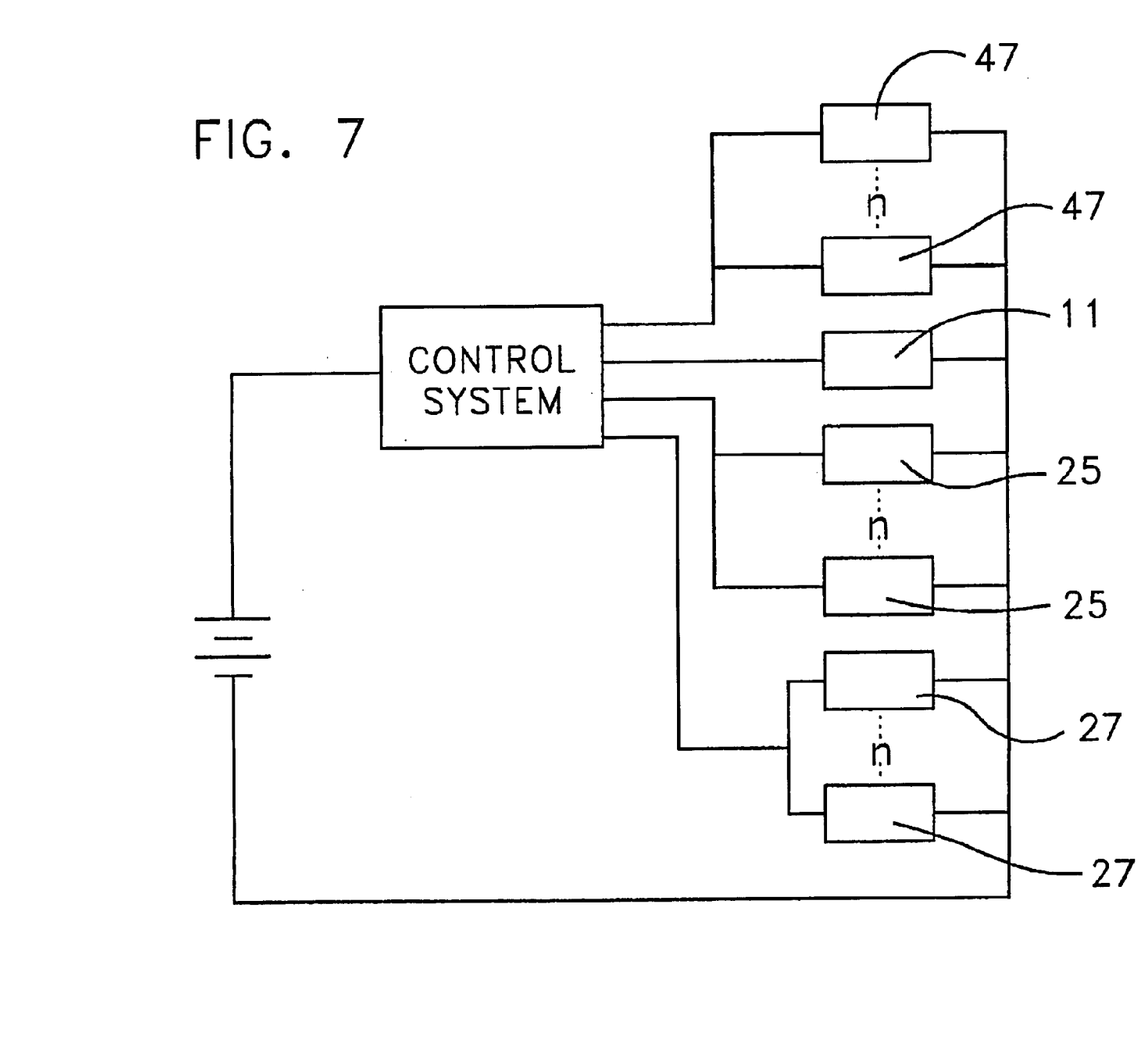
FIG. 7 is a schematic view of the present invention.

With reference now to the drawings, and in particular to FIGS. 1 through 7 thereof, a new robotic arm and hand embodying the principles and concepts of the present invention and generally designated by the reference numeral 10 will be described.

As best illustrated in FIGS. 1 through 7, the robotic arm and hand 10 generally comprises a motor member 11 being coupled to a frame member 12. The motor member 11 is designed for being operationally coupled to the control system and a power source whereby the control system is for controlling power from the power supply to the motor member 11.

A drive assembly 13 is operationally coupled to the motor member 11 whereby the drive assembly 13 is rotated by the motor member 11. A plurality of cable assemblies 14 are coupled to the drive assembly 13 whereby each of the cable assemblies 14 is actuated by the drive assembly 13 when the drive assembly 13 is rotated by the motor member 11.

A plurality of phalange assemblies 15 are coupled to the cable assemblies 14. Each of the phalange assemblies 15 is designed for being moved like the fingers of a human when the cable assemblies 14 are actuated by the drive assembly 13.

The drive assembly 13 comprises a pair of gear members 16. Each of the gear members 16 is operationally coupled to the motor member 11 whereby the gear members 16 are rotated by the motor member 11. Each of the gear members 16 selectively engages each of the cable assemblies 14 for actuating the cable assemblies 14.

Each of the cable assemblies 14 comprises a cable member 17 and a plurality of gears 18. Each of the gears 18 is coupled to the cable member 17 whereby each of the Sears 18 selectively engages one of the gear members 16 of the drive assembly 13. Each of the gears 18 transfers rotational movement of the gear members 16 of the drive assembly 13 to the cable member 17 of the associated one of the cable assemblies 14 for rotating the cable member 17 to actuate the associated one of the phalange assemblies 15. The cable member 17 of each of the cable assemblies 14 not being rotated when the gears 18 of the associated one of the cable assemblies 14 are not engaged with the gear members 16 of the drive assembly 13.

The plurality of gears 18 of each of the cable assemblies 14 comprises a first gear 19 and a second gear 20. The first gear 19 selectively engages a first 21 of the gear members 16 of the drive assembly 13 whereby the first 21 of the gear members 16 is for rotating the cable member 17 of the associated one of the cable assemblies 14 in a first direction. The second gear 20 selectively engages a second 22 of the gear members 16 of the drive assembly 13 whereby the second 22 of the gear members 16 is for rotating the cable member 17 of the associated one of the cable assemblies 15 in a second direction.

Each of the cable assemblies 14 comprises an interior actuating member 23 and an exterior actuating member 24. The interior actuating member 23 is operationally coupled to the cable member 17 of the associated one of the cable assemblies 14. The interior actuating member 23 is designed for being operationally coupled to the control system whereby the interior actuating member 23 is for moving the cable member 17 to engage the first gear 19 to the first 21 of the gear members 16 of the drive assembly 13 when the interior actuating member 23 is actuated by the control system The exterior actuating member 24 is operationally coupled to the cable member 17 of the associated one of the cable assemblies 14. The exterior actuating member 24 is designed for being operationally coupled to the control system whereby the exterior actuating member 24 is for moving the cable member 17 to engage the second gear 20 to the second 22 of the gear members 16 of the drive assembly 13 when the exterior actuating member 24 is actuated by the user.

The interior actuating member 23 of each of the cable assemblies 14 comprises an interior solenoid 25 and an interior arm portion 26. The interior solenoid 25 is designed for being operationally coupled to the control system whereby the interior solenoid 25 is actuatable by the control system. The interior arm portion 26 is coupled between the interior solenoid 25 and the cable member 17 of the associated one of the cable assemblies 14 whereby the interior arm portion 26 is for moving the cable member 17 to engage the first gear 19 to the first one of the gear members 16 of the drive assembly 13 when the interior solenoid 25 is actuated by the control system.

The exterior actuating member 24 of each of the cable assemblies 14 comprises an exterior solenoid 27 and an exterior arm portion 28. The exterior solenoid 27 is designed for being operationally coupled to the control system whereby the exterior solenoid 27 is actuatable by the control system. The exterior arm portion 28 is coupled between the exterior solenoid 27 and the cable member 17 of the associated one of the cable assemblies 15 whereby the exterior arm portion 28 is for moving the cable member 17 to engage the second gear 20 to the second one of the gear members 16 of the drive assembly 13 when the exterior solenoid 27 is actuated by the control system.

An alignment plate 29 is coupled to the frame member 12. The cable member 17 of each of the cable assemblies 14 extends through the alignment plate 29 whereby the alignment plate 29 is for maintaining alignment of the cable member 17 of each of the cable assemblies 14 between the drive assembly 13 and an associated one of the phalange assemblies 15. The interior actuating member 23 and the exterior actuating member 24 of each of the cable assemblies 14 is coupled to the alignment plate 29 proximate the cable member 17 of the associated one of the cable assemblies 14 for maintaining alignment of the interior actuating member 23 and the exterior actuating member 24 with respect to the cable member 17 of the associated one of the cable assemblies 14.

The alignment plate 29 comprises a plurality of slots 30. Each of the slots 30 extends through the alignment plate 29. Each of the slots 30 of the alignment plate 29 selectively receives the cable member 17 of one of the cable assemblies 14 whereby each of the slots 30 is for maintaining alignment of the cable member 17 of the associated one of the cable assemblies 14.

Each of the cable assemblies 14 comprises a bearing member 31. The bearing member 31 is positioned around the cable member 17 of the associated one of the cable assemblies 14 whereby the beating member 31 is positioned in one of the slots 30 of the alignment plate 29. The bearing member 31 is for permitting the cable member 17 to be rotated freely and prevent binding of the cable member 17 on the alignment plate 29.

Each of the phalange assemblies 15 comprises a base portion 32, a proximal phalanx member 33, a middle phalanx member 34 and a distal phalanx member 35. The base portion 32 is coupled to the frame member 12. The proximal phalanx member 33 is pivotally coupled to the base portion 32. The proximal phalanx member 33 is operationally coupled to cable member 17 of one of the cable assemblies 14 whereby the proximal phalanx member 33 is pivoted with respect to the base portion 32 when the cable member 17 of the associated one of the cable assemblies 14 is rotated. The middle phalanx member 34 is pivotally coupled to the proximal phalanx member 33. The middle phalanx member 34 is operationally coupled to the cable member 17 of one of the cable assemblies 15 whereby the middle phalanx member 34 is pivoted with respect to the proximal phalanx member 33 when the cable member 17 of the associated one of the cable assemblies 15 is rotated. The distal phalanx member 35 is pivotally coupled to the middle phalanx member 34 whereby the distal phalanx member 35 is pivoted with respect to the middle phalanx member 34 when the middle phalanx member 34 is pivoted.

Each of the phalange assemblies 15 comprises a proximal threaded rod 36 and a proximal linkage arm 37. Tile proximal threaded rod 36 is rotatably coupled to the base portion 32. The proximal threaded rod 36 is coupled to the cable member 17 of the associated one of the cable assemblies 14 whereby the proximal threaded rod 36 is rotated with respect to the base portion 32 when the cable member 17 of the associated one of the cable assemblies 14 is rotated. The proximal linkage arm 37 is pivotally coupled to the proximal phalanx member 33 and threadably coupled to the proximal threaded rod 36 whereby rotation of the proximal threaded rod 36 translates the proximal linkage arm 37 along a length of the proximal threaded rod 36 for pivoting the proximal phalanx member 33 with respect to the base portion 32.

Each of the phalange assemblies 15 comprises a middle threaded rod 38 and a middle linkage arm 39. The middle threaded rod 38 is rotatably coupled to the proximal phalanx member 33. The middle threaded rod 38 is coupled to the cable member 17 of the associated one of the cable assemblies 14 whereby the middle threaded rod 38 is rotated with respect to the proximal phalanx member 33 when the cable member 17 of the associated one of the cable assemblies 14 is rotated. The middle linkage arm 39 is pivotally coupled to the middle phalanx member 34 and threadably coupled to the middle threaded rod 38 whereby rotation of the middle threaded rod 38 translates the middle linkage arm 39 along a length of the middle threaded rod 38 for pivoting the middle phalanx member 34 with respect to the proximal phalanx member 33.

Each of the phalange assemblies 15 comprises a distal linkage arm 40. The distal linkage arm 40 is pivotally coupled to the proximal phalanx member 33 and pivotally coupled to the distal phalanx member 35 whereby the distal linkage arm 40 is for pivoting the distal phalanx member 35 with respect to the middle phalanx member 34 when the proximal phalanx member 33 is pivoted with respect to the base portion 32.

A digit assembly 41 is coupled to one of the phalange assemblies 15 whereby the digit assembly 41 moves with the associated one of the phalange assemblies 15. The digit assembly 41 is designed for imitating the little finger of a human hand whereby the associated one of the phalange assemblies 15 imitates the ring finger of the human hand. The digit assembly 41 comprises a proximal digit member 42, a middle digit member 43 and a distal digit member 44. The middle digit member 43 is pivotally coupled to the proximal digit member 42. The distal digit member 44 is pivotally coupled to the middle digit member 43. The proximal digit member 42 is coupled to the proximal phalanx member 33 of the associated one of the phalange assemblies 15. The middle digit member 43 is coupled to the middle phalanx member 34 of the associated one of the phalange assemblies 15 for pivoting the middle digit member 43 with respect to the proximal digit member 42 when the middle phalanx member 34 is pivoted with respect to the proximal phalanx member 33. The distal digit member 44 is coupled to the distal phalanx member 35 of the associated one of the phalange assemblies 15 for pivoting the distal digit member 44 with respect to the middle digit member 43 when the distal phalanx member 35 is pivoted with respect to the middle phalanx member 34.

A wrist assembly 45 is operationally coupled between the frame member 12 and the phalange assemblies 15. The wrist assembly 45 is for permitting movement of the phalange assemblies 15 with respect to the frame member 12.

The wrist assembly 45 comprises a wrist frame 46 and a plurality of wrist cables 47. The wrist cables 47 are coupled to the frame member 12. Each of the wrist cables 47 is coupled to the wrist frame 46 whereby the wrist cables 47 support the wrist frame 46 from the frame member 12.

In use, the user couples the motor member 11, the interior solenoid 25 of each of the cable assemblies 14, the exterior solenoid 27 of each of the cable assemblies 14 and the wrist cables 47 to the control system. Then control system then controls the motor member 11 to rotate the gear members 16. The interior solenoid 25 and the exterior solenoid 27 of each of the cable assemblies 14 are actuated by the computer to allow one of the gears 18 coupled to the cable member 17 to contact one of the gear member 16 to allow the cable 17 to be rotated to actuate the phalange assemblies 15 in response to the control system. The phalange assemblies 15 are actuated to grip items.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A robotic arm and hand for being controlled by a control system, the robotic arm and hand comprising:

a motor member being coupled to a frame member, said motor member being adapted for being operationally coupled to the control system and a power source such that the control system is for controlling power from the power supply to said motor member;

a drive assembly being operationally coupled to said motor member such that said drive assembly is rotated by said motor member;

a plurality of cable assemblies being coupled to said drive assembly such that each of said cable assemblies is actuated by said drive assembly when said drive assembly is rotated by said motor member;

a plurality of phalange assemblies being coupled to said cable assemblies, each of said phalange assemblies being adapted for being moved like the fingers of a human when said cable assemblies are actuated by said drive assembly;

said drive assembly comprising a pair of sear members each of said gear members being operationally coupled to said motor member such that said gear members are rotated by said motor member each of said gear members selectively engaging each of said cable assemblies for actuating said cable assemblies; and each of said cable assemblies comprising a cable member and a plurality of gears, each of said sears being coupled to said cable member such that each of said gears selectively engages one of said sear members of said drive assembly, each of said gears transferring rotational movement of said gear members of said drive assembly to said cable member of the associate one of said cable assemblies for rotating said cable member to actuate the associated one of said phalange assemblies.

2. The robotic arm and hand as set forth in claim 1, further comprising:

said plurality of gears of each of said cable assemblies comprising a first gear and a second gear, said first gear selectively engaging a first of said gear members of said drive assembly such that said first of said gear members is for rotating said cable member of the associated one of said cable assemblies in a first direction, said second gear selectively engaging a second of said gear members of said drive assembly such that said second of said gear members is for rotating said cable member of the associated one of said cable assemblies in a second direction.

3. The robotic arm and hand as set forth in claim 2, further comprising:

each of said cable assemblies comprising an interior actuating member and an exterior actuating member, said interior actuating member being operationally coupled to said cable member of the associated one of said cable assemblies, said interior actuating member being adapted for being operationally coupled to the control system such that said interior actuating member is for moving said cable member to engage said first gear to said first of said gear members of said drive assembly when said interior actuating member is actuated by the control system, said exterior actuating member being operationally coupled to said cable member of the associated one of said cable assemblies, said exterior actuating member being adapted for being operationally coupled to the control system such that said exterior actuating member is for moving said cable member to engage said second gear to said second of said gear members of said drive assembly when said exterior actuating member is actuated by the user.

4. The robotic arm and hand as set forth in claim 3, further comprising:

said interior actuating member of each of said cable assemblies comprising an interior solenoid and an interior arm portion, said interior solenoid being adapted for being operationally coupled to the control system such that said interior solenoid is actuatable by the control system, said interior arm portion being coupled between said interior solenoid and said cable member of the associated one of said cable assemblies such that said interior arm portion is for moving said cable member to engage said first gear to said first one of said gear members of said drive assembly when said interior solenoid is actuated by the control system.

5. The robotic arm and hand as set forth in claim 3, further comprising:

said exterior actuating member of each of said cable assemblies comprising an exterior solenoid and an exterior arm portion, said exterior solenoid being adapted for being operationally coupled to the control system such that said exterior solenoid is actuatable by the control system, said exterior arm portion being coupled between said exterior solenoid and said cable member of the associated one of said cable assemblies such that said exterior arm portion is for moving said cable member to engage said second gear to said second one of said gear members of said drive assembly when said exterior solenoid is actuated by the control system.

6. The robotic arm and hand as set forth in claim 3, further comprising:

an alignment plate being coupled to said frame member, said cable member of each of said cable assemblies extending through said alignment plate such that said alignment plate is for maintaining alignment of said cable member of each of said cable assemblies between said drive assembly and an associated one of said phalange assemblies, said interior actuating member and said exterior actuating member of each of said cable assemblies being coupled to said alignment plate proximate said cable member of the associated one of said cable assemblies for maintaining alignment of said interior actuating member and said exterior actuating member with respect to said cable member of the associated one of said cable assemblies.

7. The robotic arm and hand as set forth in claim 1, further comprising:

each of said phalange assemblies comprising a base portion, a proximal phalanx member, a middle phalanx member and a distal phalanx member, said base portion being coupled to said frame member, said proximal phalanx member being pivotally coupled to said base portion, said proximal phalanx member being operationally coupled to cable member of one of said cable assemblies such that said proximal phalanx member is pivoted with respect to said base portion when said cable member of the associated one of said cable assemblies is rotated, said middle phalanx member being pivotally coupled to said proximal phalanx member, said middle phalanx member being operationally coupled to said cable member of one of said cable assemblies such that said middle phalanx member is pivoted with respect to said proximal phalanx member when said cable member of the associated one of said cable assemblies is rotated, said distal phalanx member being pivotally coupled to said middle phalanx member such that said distal phalanx member is pivoted with respect to said middle phalanx member when said middle phalanx member is pivoted.

8. The robotic arm and hand as set forth in claim 7, further comprising:

each of said phalange assemblies comprising a proximal threaded rod and a proximal linkage arm, said proximal threaded rod being rotatably coupled to said base portion, said proximal threaded rod being coupled to said cable member of the associated one of said cable assemblies such that said proximal threaded rod is rotated with respect to said base portion when said cable member of the associated one of said cable assemblies is rotated, said proximal linkage arm being pivotally coupled to said proximal phalanx member and threadably coupled to said proximal threaded rod such that rotation of said proximal threaded rod translates said proximal linkage arm along a length of said proximal threaded rod for pivoting said proximal phalanx member with respect to said base portion.

9. The robotic arm and hand as set forth in claim 7, further comprising:

each of said phalange assemblies comprising a middle threaded rod and a middle linkage arm, said middle threaded rod being rotatably coupled to said proximal phalanx member, said middle threaded rod being coupled to said cable member of the associated one of said cable assemblies such that said middle threaded rod is rotated with respect to said proximal phalanx member when said cable member of the associated one of said cable assemblies is rotated, said middle linkage arm being pivotally coupled to said middle phalanx member and threadably coupled to said middle threaded rod such that rotation of said middle threaded rod translates said middle linkage arm along a length of said middle threaded rod for pivoting said middle phalanx member with respect to said proximal phalanx member.

10. The robotic arm and hand as set forth in claim 7, further comprising:

each of said phalange assemblies comprising a distal linkage arm, said distal linkage arm being pivotally coupled to said proximal phalanx member and pivotally coupled to said distal phalanx member such that said distal linkage arm is for pivoting said distal phalanx member with respect to said middle phalanx member when said proximal phalanx member is pivoted with respect to said base portion.

11. The robotic arm and hand as set forth in claim 1, further comprising:

a digit assembly being coupled to one of said phalange assemblies such that said digit assembly moves with the associated one of said phalange assemblies, said digit assembly being adapted for imitating the little finger of a human hand such that the associated one of said phalange assemblies imitates the ring finger of the human hand.

12. The robotic arm and hand as set forth in claim 1, further comprising:

a wrist assembly being operationally coupled between said frame member and said phalange assemblies, said wrist assembly being for permitting movement of said phalange assemblies with respect to said frame member.

13. The robotic arm and hand as set forth in claim 12, further comprising:

said wrist assembly comprising a wrist frame and a plurality of wrist cables, said wrist cables being coupled to said frame member, each of said wrist cables being coupled to said wrist frame such that said wrist cables support said wrist frame from said frame member.

14. A robotic arm and hand for being controlled by a control system, the robotic arm and hand comprising:

a motor member being coupled to a frame member, said motor member being adapted for being operationally coupled to the control system and a power source such that the control system is for controlling power from the power supply to said motor member;

a drive assembly being operationally coupled to said motor member such that said drive assembly is rotated by said motor member;

a plurality of cable assemblies being coupled to said drive assembly such that each of said cable assemblies is actuated by said drive assembly when said drive assembly is rotated by said motor member;

a plurality of phalange assemblies being coupled to said cable assemblies, each of said phalange assemblies being adapted for being moved like the fingers of a human when said cable assemblies are actuated by said drive assembly;

said drive assembly comprising a pair of gear members, each of said gear members being operationally coupled to said motor member such that said gear members are rotated by said motor member, each of said gear members selectively engaging each of said cable assemblies for actuating said cable assemblies;

each of said cable assemblies comprising a cable member and a plurality of gears, each of said gears being coupled to said cable member such that each of said gears selectively engages one of said gear members of said drive assembly, each of said gears transferring rotational movement of said gear members of said drive assembly to said cable member of the associated one of said cable assemblies for rotating said cable member to actuate the associated one of said phalange assemblies;

said plurality of gears of each of said cable assemblies comprising a first gear and a second gear, said first gear selectively engaging a first of said gear members of said drive assembly such that said first of said gear members is for rotating said cable member of the associated one of said cable assemblies in a first direction, said second gear selectively engaging a second of said gear members of said drive assembly such that said second of said gear members is for rotating said cable member of the associated one of said cable assemblies in a second direction;

each of said cable assemblies comprising an interior actuating member and an exterior actuating member, said interior actuating member being operationally coupled to said cable member of the associated one of said cable assemblies, said interior actuating member being adapted for being operationally coupled to the control system such that said interior actuating member is for moving said cable member to engage said first gear to said first of said gear members of said drive assembly when said interior actuating member is actuated by the control system, said exterior actuating member being operationally coupled to said cable member of the associated one of said cable assemblies, said exterior actuating member being adapted for being operationally coupled to the control system such that said exterior actuating member is for moving said cable member to engage said second gear to said second of said gear members of said drive assembly when said exterior actuating member is actuated by the user;

said interior actuating member of each of said cable assemblies comprising an interior solenoid and an interior arm portion, said interior solenoid being adapted for being operationally coupled to the control system such that said interior solenoid is actuatable by the control system, said interior arm portion being coupled between said interior solenoid and said cable member of the associated one of said cable assemblies such that said interior arm portion is for moving said cable member to engage said first gear to said first one of said gear members of said drive assembly when said interior solenoid is actuated by the control system;

said exterior actuating member of each of said cable assemblies comprising an exterior solenoid and an exterior arm portion, said exterior solenoid being adapted for being operationally coupled to the control system such that said exterior solenoid is actuatable by the control system, said exterior arm portion being coupled between said exterior solenoid and said cable member of the associated one of said cable assemblies such that said exterior arm portion is for moving said cable member to engage said second gear to said second one of said gear members of said drive assembly when said exterior solenoid is actuated by the control system;

an alignment plate being coupled to said frame member, said cable member of each of said cable assemblies extending through said alignment plate such that said alignment plate is for maintaining alignment of said cable member of each of said cable assemblies between said drive assembly and an associated one of said phalange assemblies, said interior actuating member and said exterior actuating member of each of said cable assemblies being coupled to said alignment plate proximate said cable member of the associated one of said cable assemblies for maintaining alignment of said interior actuating member and said exterior actuating member with respect to said cable member of the associated one of said cable assemblies;

said alignment plate comprising a plurality of slots, each of said slots extending through said alignment plate, each of said slots of said alignment plate selectively receiving said cable member of one of said cable assemblies such that each of said slots is for maintaining alignment of said cable member of the associated one of said cable assemblies;

each of said cable assemblies comprising a bearing member, said bearing member being positioned around said cable member of the associated one of said cable assemblies such that said bearing member is positioned in one of said slots of said alignment plate, said bearing member being for permitting said cable member to be rotated freely and prevent binding of said cable member on said alignment plate;

each of said phalange assemblies comprising a base portion, a proximal phalanx member, a middle phalanx member and a distal phalanx member, said base portion being coupled to said frame member, said proximal phalanx member being pivotally coupled to said base portion, said proximal phalanx member being operationally coupled to cable member of one of said cable assemblies such that said proximal phalanx member is pivoted with respect to said base portion when said cable member of the associated one of said cable assemblies is rotated, said middle phalanx member being pivotally coupled to said proximal phalanx member, said middle phalanx member being operationally coupled to said cable member of one of said cable assemblies such that said middle phalanx member is pivoted with respect to said proximal phalanx member when said cable member of the associated one of said cable assemblies is rotated, said distal phalanx member being pivotally coupled to said middle phalanx member such that said distal phalanx member is pivoted with respect to said middle phalanx member when said middle phalanx member is pivoted;

each of said phalange assemblies comprising a proximal threaded rod and a proximal linkage arm, said proximal threaded rod being rotatably coupled to said base portion, said proximal threaded rod being coupled to said cable member of the associated one of said cable assemblies such that said proximal threaded rod is rotated with respect to said base portion when said cable member of the associated one of said cable assemblies is rotated, said proximal linkage arm being pivotally coupled to said proximal phalanx member and threadably coupled to said proximal threaded rod such that rotation of said proximal threaded rod translates said proximal linkage arm along a length of said proximal threaded rod for pivoting said proximal phalanx member with respect to said base portion;

each of said phalange assemblies comprising a middle threaded rod and a middle linkage arm, said middle threaded rod being rotatably coupled to said proximal phalanx member, said middle threaded rod being coupled to said cable member of the associated one of said cable assemblies such that said middle threaded rod is rotated with respect to said proximal phalanx member when said cable member of the associated one of said cable assemblies is rotated, said middle linkage arm being pivotally coupled to said middle phalanx member and threadably coupled to said middle threaded rod such that rotation of said middle threaded rod translates said middle linkage arm along a length of said middle threaded rod for pivoting said middle phalanx member with respect to said proximal phalanx member;

each of said phalange assemblies comprising a distal linkage arm, said distal linkage arm being pivotally coupled to said proximal phalanx member and pivotally coupled to said distal phalanx member such that said distal linkage arm is for pivoting said distal phalanx member with respect to said middle phalanx member when said proximal phalanx member is pivoted with respect to said base portion;

a digit assembly being coupled to one of said phalange assemblies such that said digit assembly moves with the associated one of said phalange assemblies, said digit assembly being adapted for imitating the little finger of a human hand such that the associated one of said phalange assemblies imitates the ring finger of the human hand;

said digit assembly comprising a proximal digit member, a middle digit member and a distal digit member, said middle digit member being pivotally coupled to said proximal digit member, said distal digit member being pivotally coupled to said middle digit member, said proximal digit member being coupled to said proximal phalanx member of the associated one of said phalange assemblies, said middle digit member being coupled to said middle phalanx member of the associated one of said phalange assemblies for pivoting said middle digit member with respect to said proximal digit member when said middle phalanx member is pivoted with respect to said proximal phalanx member, said distal digit member being coupled to said distal phalanx member of the associated one of said phalange assemblies for pivoting said distal digit member with respect to said middle digit member when said distal phalanx member is pivoted with respect to said middle phalanx member;

a wrist assembly being operationally coupled between said frame member and said phalange assemblies, said wrist assembly being for permitting movement of said phalange assemblies with respect to said frame member; and said wrist assembly comprising a wrist frame and a plurality of wrist cables, said wrist cables being coupled to said frame member, each of said wrist cables being coupled to said wrist frame such that said wrist cables support said wrist frame from said frame member.

* * * * *